Nov. 4, 1958
F. E. HEIBERGER
2,859,355
POWER PRESS CONTROL CIRCUIT
Filed July 31, 1957
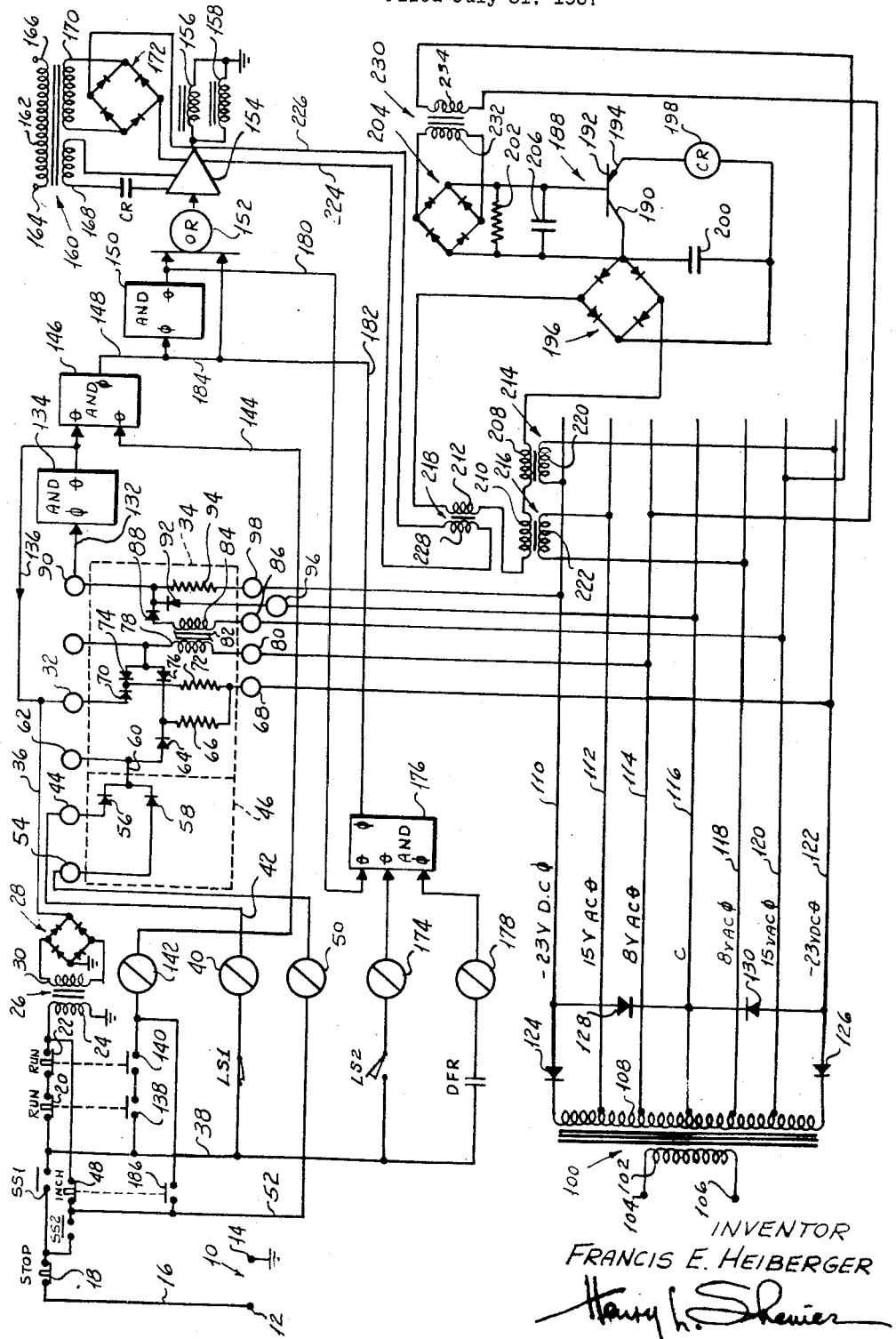
INVENTOR
FRANCIS E. HEIBERGER
ATTORNEY United States Patent Office 2,859,355
Patented Nov. 4, 1958

2,859,355

POWER PRESS CONTROL CIRCUIT

Francis E. Heiberger, Elmhurst, Ill., assignor to Danly Machine Specialties, Inc., Chicago, Ill., a corporation of Illinois Application July 31, 1957, Serial No. 675,329

9 Claims. (Cl. 307—43)

My invention relates to a power press control circuit and more particularly to a monitoring circuit which ensures that the control circuit will fail safe in the event that any one of the control circuit power supplies fails.

Control circuits employing electromagnetic relays having movable armatures are well-known in the art for controlling the operation of machines such as power presses and the like. These control circuits are provided with means for preventing accidental operation of the press when one of the electromagnetic devices fails to avoid damage to the press or injury to the operating personnel. These electromagnetic control devices including moving parts are subject to wear and breakage resulting in delays in and losses of production when the press is stopped. These electromagnetic control devices require considerable power for their operation and are therefore subject to the deteriorating effect of heat which is generated as power is consumed.

Recently, static control devices such as magnetic amplifiers and transistors have come into wide use to perform the control functions heretofor performed by electromagnetic relays. These static devices have no moving parts and operate on relatively low amounts of power as compared with electromagnetic devices. The static controls have an extremely long life to assure substantially continuous and trouble-free operation of the control circuits.

One type of static control device for performing the functions of an arrangement of relays is a unit including only static components such as crystal diodes, saturable core transformers, and resistors. It is manufactured by Westinghouse Electric Company and sold under the trade name "Cypak." As will be explained hereinafter these static control devices require a power supply which provides various voltages of different magnitudes or phases for their proper operation. If certain elements of the supply fail, a drop in potential occurs at some point in the circuit. If other elements of the supply fail, an unexpected increase in potential occurs at other points in the supply of the circuit. If any component of the supply circuit fails, the danger exists that an accidental misoperation of the power press may occur.

I have invented a monitoring circuit for use with a power press control circuit which prevents a misoperation of the controlled machine such as a power press in the event any element of the power supply fails. In other words, my monitoring circuit ensures that the control circuit will "fail safe" in the event of a failure in a power supply element. My circuit is rugged and reliable to have a life comparable to the life of the static control circuit with which it is employed. One object of my invention is to provide a monitoring circuit which ensures against an accidental misoperation of the controlled machine under the action of the control circuit in the event an element of the power supply fails.

Another object of my invention is to provide a monitoring circuit for use with a control circuit power supply which ensures that the control circuit will fail safe.

A further object of my invention is to provide a monitoring circuit for a control circuit power supply which has a life comparable to the life of the static controlled circuit.

Other and further objects of my invention will appear from the following description:

In general, my invention contemplates the provision of a monitoring circuit for a control circuit having a power supply with elements which may fail to cause an unwanted increase in a potential in the supply and elements which may fail to cause unwanted drops in potential at other points in the supply. My monitoring circuit has means for combining the potentials which drop on occurrence of a failure to produce a first voltage. The arrangement is such that a drop in any of these potentials produces the same effect on the first voltage. I provide means for comparing the first voltage with a second voltage derived from the potential which rises on occurrence of a failure normally to energize a relay. On occurrence of any failure, the relay drops out to disable the control circuit.

In the accompanying drawing to which reference is made in the following description, the drawing is a schematic view of a power press control circuit provided with my monitoring circuit.

Referring now more particularly to the drawing for purposes of convenience I have shown my monitoring circuit in use in a power press control circuit made up of static control elements such as "Cypak" elements referred to hereinabove. The control circuit includes a power supply, indicated generally by the reference character 10, having a pair of terminals 12 and 14 connected respectively to a conductor 16 and to ground. I connect a manually operable stop push button switch 18, a selector switch SS1 and a pair of normally closed "run" push button switches 20 and 22 in series between conductor 16 and one terminal of the primary winding 24 of transformer, indicated generally by the reference character 26. I connect the other terminal of winding 24 to ground. A full wave rectifier, indicated generally by the reference character 28, connected across the secondary winding 30 of transformer 26 provides a full wave rectified output voltage which I apply to one terminal 32 of a static control element 34 by means of a conductor 36.

I connect a limit switch LS1 operated by the press slide (not shown) in a manner to be described between a conductor 38 connected to the common connection of switch SS1 and switch 20 and the input terminal of a transformer and full wave rectifier indicated by the symbol identified by the reference character 40. The element 40 includes a transformer similar to transformer 26 and a full wave rectifier like rectifier 28 to produce a full wave rectified output from an alternating current input. For purposes of simplicity this arrangement has been indicated by the symbol 40 in the drawings. A conductor 42 applies the output signal from element 40 to one input terminal 44 of a static control element 46.

I connect a selector switch SS2 and a normally closed inching switch 48 in series with each other and in parallel with the series circuit including switch SS1 and switches 20 and 22. I connect a transformer and rectifier element 50 between a conductor 52 leading to the common connection of SS2 and switch 48 and a second input terminal 54 of the element 46. Element 46 is formed by a pair of crystal diodes 56 and 58 formed of a material such as germanium or silicon. The arrangement of the crystals is such that if an input signal is applied to either of the input terminals 44 and 54 the output conductor 60 of the unit carries an output signal. I connect conductor 60 to a second input terminal 62 of the element 34.

It is to be noted that while I have shown the elements 34 and 46 as being separate units in practice they are formed as a single, plug-in unit. Since, as has been explained, the element 46 produced an output signal if an input signal is applied to either of the terminals. This element is known as a "two-input Or" unit.

I connect a crystal diode 64 and a resistor 66 between the input terminal 62 of element 34 and a power supply input terminal 68 of unit 34. I connect a crystal diode 70 and a resistor 72 in series between input terminal 32 and the terminal 68. The orientation of the respective diodes 70 and 64 is such that they permit current to flow from the respective terminals 32 and 62 toward terminal 68 and substantially block current flow in the reverse direction. Crystal diodes 74 and 76 connect one terminal of a reset winding 78 to the respective diodes 70 and 64. Diodes 74 and 76 are arranged to permit current to flow upwardly through winding 78 as viewed in the drawing and to prevent substantial current flow in the reverse direction. A terminal 80 is adapted to connect a reset voltage to the terminal of winding 78 remote from that to which the crystals 74 and 76 are connected. A saturable core 82 carries winding 78 and a gating winding 84. Windings 78 and 84 are so disposed on core 82 that currents flowing upwardly through the respective windings as viewed in the figure produce opposite effects on the core. A terminal 86 is adapted to connect gating winding 84 to a gating voltage source to be described hereinafter. I connect a diode 88 between the terminal of winding 84 remote from terminal 86 and the output terminal 90 of element 34. I connect a crystal diode 92 and a resistance 94 respectively between terminal 90 and a common or reference terminal 96 and between terminal 90 and a bias potential terminal 98.

The arrangement of the element 34 is such that with proper bias potentials applied to terminals 68 and 98 and with reset and gating voltages applied to terminals 80 and 86 output terminal 90 carries an output signal as long as, and only as long as, input signals are applied to both input terminals 32 and 62. For this reason this element is known as a "two-input And" circuit.

In order that the two-input And element 34 function in its intended manner, it is necessary that biasing and reset and gating pulses of the proper magnitude and phase relationship be applied to the terminals 68, 80, 86 and 98. In one use of this element, the biasing voltage applied to terminal 68 may for example be of the magnitude of minus 23 volts half-wave rectified direct current including alternate half cycles of an alternating current supply voltage. For purposes of convenience I have designated these half cycles as being of the θ phase. The reset potentials applied to terminal 80 may be, for example, an alternating current having a magnitude of 8 volts and being adapted to produce, when half-wave rectified, voltage pulses of the same phase as the pulses of the potential applied to terminal 68. For purposes of convenience this potential is designated as 8 volts alternating current of the θ phase. The gating voltage applied to terminal 86 for the example being discussed should have a magnitude of approximately 15 volts and be alternating current voltage 180 degrees out of phase with the reset voltage. This voltage is designated for being of the φ phase. The biasing potential applied to terminal 98 should be minus 23 volts half-wave rectified direct current of the φ phase. With these reset, gating and biasing voltages applied to the terminals of element 34, element 34 produces an output as long as inputs are applied to both terminals 62 and 32.

With the phase relationships as discussed above, the input potentials may be full-wave rectified direct current or half-wave rectified direct current of the θ phase. With such inputs element 34 produces a half-wave rectified output voltage of the φ phase. The magnitude of the input potentials may be of the order of 15 volts.

In operation of the element 34 as long as inputs are applied to both terminals 62 and 32, potentials exist across resistors 66 and 72 which effectively block crystals 74 and 76 to prevent any reset current from flowing in winding 78 during the reset or θ half cycle. Since no reset current can flow, the gating voltage applied to terminal 84 drives core 82 to saturation during the φ half cycle to cause a pulse of voltage to be put out during each φ half cycle. During the θ half cycle, the gating voltage can produce no current flow in winding 84 owing to the orientation of crystal diode 88. If either of the input signals to terminals 32 and 62 is missing during the reset half cycle, the corresponding crystal 76 or 74 will not be blocked and a reset current flows during the θ half cycle. This current resets core 82 with the result that on the next φ half cycle the gating potential produces no output since its energy must be used to drive the core again toward saturation.

My power supply for providing the reset and gating voltages and the biasing potentials for the two input And element 34 includes a transformer, indicated generally by the reference character 100, having a primary winding 102 connected to the terminals 104 and 106 of a source of alternating current potential. Transformer 100 has a secondary winding 108 having a plurality of respective taps to which I connect respective supply lines 110, 112, 114, 116, 118, 120 and 122. Respective crystal diodes 124 and 126 connected in lines 110 and 122 provide respective half-wave rectified potentials on these lines. I connect a pair of respective crystal diodes 128 and 130 between lines 110 and 122 and the common or center tap connected line 116. The magnitude of the source having terminals 104 and 106, the turns ratio of windings 102 and 108 and the locations of the taps on windings 108 are such that the respective lines 110, 112, 114, 116, 118, 120 and 122 carry minus 23 volts D. C. of the φ phase, 15 volts A. C. of the θ phase, 8 volts A. C. of the θ phase, reference or ground potential, 8 volts A. C. of the φ phase, 15 volts A. C. of the φ phase and minus 23 volts D. C. of the θ phase. It is to be understood that these potentials are produced for the particular example described hereinabove. In other situations other potentials may be desired. For the example outlined hereinabove, in order that element 34 operate as described, I connect terminals 68, 80, 86, 96 and 98 respectively to line 122, to line 114, to line 120, to line 116, and to line 110. With these connections, as long as both terminals 62 and 32 carry input signals, during the φ phase element 34 produces a half-wave rectified output potential of the φ phase.

A channel 132 applies the output signal of element 34 to a one input And element 134. This element 134 is similar in construction and operation to the element 34. It produces an output signal as long as an input signal is supplied to the element. In the example shown since the input signal is of the φ phase, the output signal from element 34 is of the θ phase.

As has been explained hereinabove with SS1 closed, a circuit is complete from conductor 16 to input transformer 26 and from this transformer through rectifier 28 to terminal 32, as a result of which terminal 32 carries an input signal. With SS1 closed, another circuit is complete from conductor 16 through LS1 and input circuit 40 to terminal 44 of the two-input Or element 46 to cause the element to produce an output which is applied to terminal 62. From the foregoing it will be seen that with SS1 closed, element 34 produces an output signal which is fed to element 134 to cause element 134 to produce an output. I feed the output from element 134 back to the input terminal 32 of element 34 through a conductor 136. With this feedback connection element 34 continues to produce an output signal even after the run buttons are pushed to open switches 20 and 22 as long as switch LS1 and switches SS1 and 18 remain closed. That is, the feedback connection 136 sustains the input signal to terminal 32 to cause 34 to continue to produce an output signal after the run buttons are pushed. Thus element 134, which reverses the phase of the output from element 34 to produce a feedback signal of the proper phase, together with the connection 136, functions as a holding circuit for the normally closed run button switch circuit including switches 20 and 22.

It will be seen that before the run buttons are actuated with SS1 closed, element 134 continuously produces an output. I connect a pair of normally open run button operated switches 138 and 140 in series between conductor 38 and an input circuit 142 including an input transformer and rectifier. A channel 144 applies the output signal of circuit 142 to one input terminal of a two-input And circuit 146 which is the same in construction and in operation to the element 34. I apply the output signal from element 134 to the other input terminal of element 146. Before the run buttons are actuated, element 134 continuously produces an output. This output continues even after the run buttons are actuated. After the buttons are actuated, switches 138 and 140 which are ganged with the respective switches 20 and 22 close to complete a circuit to the input circuit 142 to cause circuit 142 to produce an output signal. When this occurs, both input circuits of element 146 carry signals with the result that this element produces an output signal. A channel 148 applies the output signal of element 146 to one-input And or phase reversing element 150. I apply the output signal from element 150 to one input terminal of a two-input Or element 152, which is similar in construction and operation to the element 46. I apply the output signal of the Or element 152 to a magnetic amplifier 154 in the load circuit of which I connect the respective clutch and brake solenoids 156 and 158.

A transformer, indicated generally by the reference character 160, has a primary winding 162 connected to the terminals 164 and 166 of a suitable source of potential. A first secondary winding 168 carried by the core of transformer 160 provides the power supply for amplifier 154. I connect a normally open control relay switch CR in the circuit of winding 168 so that transformer 154 cannot produce an output when this switch is open. As will be explained hereinafter, my monitoring circuit closes this switch as long as the power sources are intact. A second secondary winding 170 carried by the core of transformer 160 supplies a full-wave rectifier indicated generally by the reference character 172 which provides the direct current bias for the amplifier 154.

From the foregoing it will be seen that actuation of both run buttons to close switches 138 and 140 causes element 146 to produce an output. As a result, element 150 feeds an output signal to Or circuit 152, to cause amplifier 154 to produce an output to energize solenoids 156 and 158. The energized solenoids set the clutch and release the brake to permit the press to operate under the action of the press flywheel (not shown).

From the foregoing, it will be seen that as long as both run push buttons are actuated to close switches 138 and 140, element 146 produces an output signal. My control circuit includes means for ensuring that the press completes one full cycle even though the run buttons are released after a small movement of the press slide. I connect a normally open limit switch LS2 between conductor 38 and an input circuit 174 including a transformer and rectifier. LS2 is adapted to be operated by the press slide (not shown) to close after a movement of the slide from its top dead center position and to be open at the top dead center position of the slide. When closed the switch LS2 provides an input signal to circuit 174 the output signal of which is fed to one input terminal of a three-input And element 176. The circuit element 176 is similar in construction and operation to the element 34 with the exception that all three input signals must be present if the element is to produce an output signal. I connect a drive failure relay switch DFR and an input circuit 178 in series between conductor 38, and a second input terminal of element 176. The DFR switch closes under the action of a drive failure circuit (not shown), well known in the art, when the press selector switch is set up to permit the press to run. When closed, switch DFR and input circuit 178 provide a second input signal for element 176. I obtain the third input signal for element 176 from the output signal of And circuit 150 by means of a channel 180. A conductor 182 applies the output signal of And circuit 176 to the second input terminal of Or element 152.

As has been explained hereinabove, with switch SS1 closed and when the run buttons are actuated to close switches 138 and 140, the And element 150 feeds an input to Or circuit 152 to cause amplifier 154 to energize solenoids 156 and 158 to permit the press to move. This output signal from element 150 feeds one input signal to And circuit 176. The second input signal to element 176 is provided by the DFR switch circuit. After press has moved through a small distance, the slide closes LS2 to complete the input circuit for the third input signal to element 176. At this time And circuit 176 produces an output signal which is fed to the second input terminal of Or circuit 152 to energize the clutch and brake solenoid windings.

Before the press slide reaches the end of a complete stroke switch LS1 is momentarily opened by the press slide to remove the input signal to terminal 62 of element 34 to cut off the element output and thereby cut off the output signals from elements 134 and 146. It is to be noted that the output signal from element 176 which required an input signal to element 150 from element 146 for its initiation through channel 180 is fed to element 150 as well as to the second input terminal of Or circuit 152 through a common connection 184 between the two input terminals. As a result, even though the output from element 146 ceases when switch LS2 opens, the input to element 176 through channel 180 remains established owing to the fact that the output signal from element 176 also is fed to the input circuit of And circuit 150. After LS1 opens and while LS2 is closed, solenoids 156 and 158 remain energized and the slide continues to move. When the slide arrives at top dead center, switch LS2 opens under the action of the press slide to remove an input signal from And circuit 176 to reduce the output signal of this circuit to zero to remove the input signals from And circuit 150 and Or circuit 152 to cut off amplifier 154 to de-energize solenoids 156 and 158 to release the clutch and set the press brake to cause the press slide to stop.

The selector switch of my press control circuit may be actuated to close SS2, leaving SS1 open. In this condition of the circuit, an input signal is applied to terminal 32 of element 34 through SS2, the normally closed inch push button switch 48 and transformer 26 and rectifier 28. At the same time, SS2 supplies a potential to input circuit 50 to provide an input to terminal 62 through the Or circuit including terminal 54 and diode 58. With inputs present at both the input terminals of element 34, this element and element 134 produce output signals. This condition is sustained by feedback connection 136 even though the switch 48 opens when the inch push button is operated.

A normally open push button inch switch 186 ganged with the switch 48 is connected to provide an input signal to input circuit 142 when the inch push button is operated. It will be remembered that when an input signal is supplied to circuit 142 to provide the second input signal for And circuit 146, this circuit produces an output signal which energizes the clutch and brake solenoids through And circuit 150, Or circuit 152 and amplifier 154. As long as the inch push button is actuated, an input is supplied to the second input terminal of And circuit 146 and the clutch and brake solenoids remain energized. When the inch button is released, the input to the second terminal of And circuit 146 disappears and the press stops.

My monitoring circuit normally energizes the winding, to be described, associated with switch CR in the amplifier power supply to permit the amplifier to operate except upon failure of an element of the control circuit power supply or failure of the amplifier bias circuit power supply. My monitoring circuit includes a p-n-p transistor indicated generally by the reference character 188, having a collector 190, a base 192 and an emitter 194. I connect the output terminals of a full-wave rectifier 196 in series with the winding 198 associated with switch CR in the emitter-collector circuit of transistor 188. A capacitor 200 connected across the output terminals of rectifier 196 smoothes the voltage output of the rectifier 196. It will be seen that rectifier 196 provides the supply voltage for transistor 188. I connect a resistor 202 in parallel with the output terminals of a full-wave rectifier indicated generally by the reference character 204 in the base to collector circuit of transistor 188. A capacitor 206 connected across the output terminals 204, smoothes the voltage output of the rectifier 204. Under the action of the voltage output of rectifier 204, resistor 202 develops a bias voltage tending to render transistor 188 normally conductive. When the transistor conducts winding 198 is energized to close switch CR to permit amplifier 154 to operate.

I connect a plurality of secondary windings 208, 210 and 212 of respective monitoring transformers, indicated generally by the respective reference characters 214, 216 and 218, in series across the input terminals of rectifier 196. I connect the primary winding 220 of transformer 214 between lines 110 and 122. The primary winding 222 of transformer 216 is connected across lines 112 and 118. Respective conductors 224 and 226 connect the primary winding 228 of transformer 218 across the bias voltage supply of amplifier 154.

A monitoring transformed indicated generally by the reference character 230 includes a secondary winding 232 connected across the input terminals of rectifier 204 and a primary winding 234 connected across lines 114 and 120.

When the control circuit power supply including transformer 100 and the amplifier bias supply including rectifier 172 operates normally secondary windings 208, 210 and 212 carry voltages which are applied to the input terminals of rectifier 196 to produce the transistor supply voltage. I so select the turns ratios of the respective monitoring transformers 214, 216 and 218 such that the input signals to the respective primary windings of the transformers each has the same effect on the overall input voltage to rectifier 196. It will readily be appreciated that if any element of the control circuit supply fails so that one of the alternating current potentials to be produced by the supply is lost, the input signal to one of the primary windings 220 or 222 will be lost to cause a drop in voltage input to rectifier 196. Similarly, loss of the amplifier bias signal causes a drop in the input voltage to rectifier 196. If a power supply element fails so that either of the direct current biased voltages described hereinabove is lost, an unexpected rise in voltage occurs between lines 114 and 120. In this event the input potential to rectifier 204 increases.

In operation of my monitoring circuit, I set up the circuit so that with the control power supply and the amplifier bias supply operating properly, the supply voltage to transistor 188 from rectifier 196 and the bias voltage produced by resistor 202 render the transistor normally conductive to energize winding 198 to cause switch CR to close to permit amplifier 154 to operate. If, for any reason, the control power supply fails to provide its alternating output supply voltages, the input voltage to either winding 220 or winding 222 disappears with the result that the input voltage to rectifier 196 drops to an extent where the output potential of the rectifier is insufficient to cause the transistor to pass sufficient current to maintain winding 198 energized. As a result, switch CR opens and amplifier 154 cannot operate in response to a misoperation of the control circuit, owing to the loss of one of the required supplies. If either of the D. C. biases supplied by the control signal supply fails, an unexpected increase in the voltage between conductors 114 and 120 results. The polarity of the rectifier is such that this increase in potential causes a rise in potential of base 192 to reduce the current flow in the emitter circuit to cause the relay switch CR again to open to disable amplifier 154. A loss in the amplifier bias potential acts in the same manner as a loss of the input signal to either winding 220 or 222.

The operation of the static element control circuit will readily be understood from the description of the circuit given hereinabove. While I have shown and described my monitoring circuit as being employed in connection with this control circuit, it is to be understood that the monitoring circuit may be used in any installation in which failure of a power supply may cause misoperation of a control element to initiate a machine operation. That is, my circuit may be used in any situation where it is desired to make a control element or control circuit fail safe.

It will be seen that I have accomplished the objects of my invention. I have provided a monitoring circuit which prevents accidental misoperation of a controlled machine in the event any one of a number of power supplies associated with the control circuit fail. My circuit operates both in response to a failure which causes a drop in potential and in response to a failure which causes an unexpected increase in potential. My circuit may be used with any control element or control circuit to ensure that the element fails safe in the event of a power failure. My circuit is particularly adapted for use with static element control circuits requiring a plurality of supply signals and potentials for their operation.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A monitoring circuit for use with a power supply which may fail thereby to cause a decrease in one supplied voltage and which may fail thereby to cause an increase in another supplied voltage including in combination an electrical device having a power circuit comprising a pair of elements and a control circuit comprising a control element, means for developing a supply potential from said one supplied voltage, means for applying said supply potential across said pair of elements, means for developing a bias potential from said other supplied voltage and means for impressing said bias potential on said control element normally to cause a flow of current in said power circuit, the arrangement being such that said power circuit current flow drops below a predetermined level when said power supply fails thereby to cause a decrease in said one supplied voltage or to cause an increase in said other supplied voltage.

2. In a control circuit having a normally open switch adapted to disable said control circuit and a power supply which may fail thereby to cause a decrease in one supplied voltage and an increase in another supplied voltage, a monitoring circuit including an electrical device having an input control circuit and having an output power circuit comprising a winding adapted to be energized to close said normally open switch, means for developing a supply potential from said one supplied voltage, means for applying said supply potential to said power circuit normally to cause a flow of current in said power circuit to energize said winding, means for developing a bias potential from said other supplied voltage, and means for impressing said bias potential on said input control circuit, the arrangement being such that said power circuit current drop below the level necessary to maintain said winding energized when said power supply fails thereby to cause a decrease in said one supplied voltage or to cause an increase in said other supplied voltage.

3. A monitoring circuit as in claim 2 in which said electrical device is a transistor having an emitter and a collector and a base and in which said power circuit comprises said emitter and said collector and in which said input control circuit comprises said collector and said base.

4. A monitoring circuit as in claim 2 in which said means for developing a bias potential comprises a rectifier having input and output terminals, means for impressing said other supplied voltage on said input terminals and a resistor connected across said output terminals.

5. A monitoring circuit for a power supply which may fail thereby to produce a decrease in any one of a number of supplied voltages and which may fail thereby to produce an increase in another supplied voltage including in combination a transistor having a base and an emitter and a collector, means for developing a first bias potential from said number of supplied voltages, means for applying said first bias potential to said emitter to bias the emitter positively with respect to said base, means for developing a second bias potential from said other supplied potential, and means for applying said second bias potential to said collector to bias the collector negatively with respect to said base normally to cause a current flow in the transistor emitter circuit, the arrangement being such that said emitter current drops below a predetermined level when said power supply fails thereby either to cause a decrease in one of said number of supplied voltages or to cause an increase in said other supplied voltages.

6. A monitoring circuit as in claim 5 in which said means for developing said first bias voltage comprises a plurality of transformers each having a primary winding and a secondary winding, means for impressing the respective supplied voltages of said number on said primary windings and means for connecting said secondary windings in series to add the secondary voltages, the turns ratios of the respective transformers being such that a decrease in any one of the respective number of supplied voltages produces the same effect on the added secondary voltages as a corresponding decrease in any other of said number of voltages.

7. A monitoring circuit as in claim 5 including a relay winding in said emitter circuit.

8. A transistor comparator circuit including in combination a transistor having a base and an emitter and a collector, a first source of potential having two terminals, a load, means connecting one terminal of the load to the emitter, means connecting the other terminal of the load to one terminal of the first source of potential, means connecting the other terminal of the first source to the collector, a second source of potential of less magnitude than the first having two terminals, means connecting the base to one terminal of the second source, and means connecting the other terminal of the second source to the other terminal of first source, terminals of like polarity of the two sources being connected so that the two sources are in series opposition, whereby a voltage is produced across the load substantially equal to the difference between the two sources.

9. A transistor comparator circuit including in combination a transistor having a base and an emitter and a collector, a first source of potential, a second source of potential normally of lesser magnitude than the first, means connecting the collector to terminals of the two sources of like polarity, means connecting the other terminal of the lesser magnitude second source to the base, a load, and means connecting the load between the other terminal of the first source and the emitter whereby to produce a load voltage substantially equal to the difference between the potential of the two sources.

No references cited.